United States Patent
Yamamoto et al.

(10) Patent No.: US 8,283,075 B2
(45) Date of Patent: Oct. 9, 2012

(54) NON-AQUEOUS ELECTROLYTE SECONDARY BATTERY INCLUDING AN ELECTROLYTE CONTAINING A FLUORINATED CYCLIC CARBONATE AND CARBOXYLIC ESTER AS A SOLVENT AND A NITRILE COMPOUND AS AN ADDITIVE

(75) Inventors: Hidekazu Yamamoto, Kobe (JP); Atsushi Fukui, Kobe (JP); Taizo Sunano, Kobe (JP); Maruo Kamino, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 602 days.

(21) Appl. No.: 12/379,700

(22) Filed: Feb. 26, 2009

(65) Prior Publication Data

US 2009/0214938 A1  Aug. 27, 2009

(30) Foreign Application Priority Data

Feb. 26, 2008  (JP) .................................. 2008-044828
Sep. 11, 2008  (JP) .................................. 2008-233791

(51) Int. Cl.
  *H01M 6/16*  (2006.01)
  *H01M 4/58*  (2010.01)
(52) U.S. Cl. ..... 429/339; 429/199; 429/326; 429/231.3; 429/218.1
(58) Field of Classification Search .................. 429/324, 429/326, 327, 329, 331, 334, 338, 339, 231.1, 429/212, 231.3, 231.95, 218.1, 199
See application file for complete search history.

(56) References Cited

U.S. PATENT DOCUMENTS

| 4,017,519 | A  | * | 4/1977  | Moore et al. ................... 549/455 |
| 7,776,475 | B2 | * | 8/2010  | Shimizu et al. .......... 429/231.95 |
| 2008/0248397 | A1 | * | 10/2008 | Jung et al. ..................... 429/314 |

FOREIGN PATENT DOCUMENTS

| CN | 1961451 A    | 5/2007  |
| CN | 101090165 A  | 12/2007 |
| JP | 2004-319212 A | 11/2004 |
| JP | 2006-086058 A | 3/2006  |
| JP | 2008-041366 A | 2/2008  |
| JP | 2008-108586   | 5/2008  |

OTHER PUBLICATIONS

Office Action dated Jun. 18, 2012, issued in Chinese patent application No. 200910126303.7, and partial English translation thereof.

* cited by examiner

*Primary Examiner* — Raymond Alejandro
(74) *Attorney, Agent, or Firm* — Kubovcik & Kubovcik

(57) ABSTRACT

A non-aqueous electrolyte secondary battery has a positive electrode (1), a negative electrode (2), a separator (3) interposed between the positive electrode and the negative electrode, and a non-aqueous electrolyte solution in which a solute is dissolved in a non-aqueous solvent. The negative electrode contains a negative electrode active material capable of alloying with lithium and the non-aqueous solvent of the non-aqueous electrolyte solution contains one ore more fluorinated cyclic carbonates and a carboxylic ester. In addition, the non-aqueous electrolyte solution contains a nitrile compound having a chain saturated hydrocarbon group having two or more carbon atoms.

5 Claims, 1 Drawing Sheet

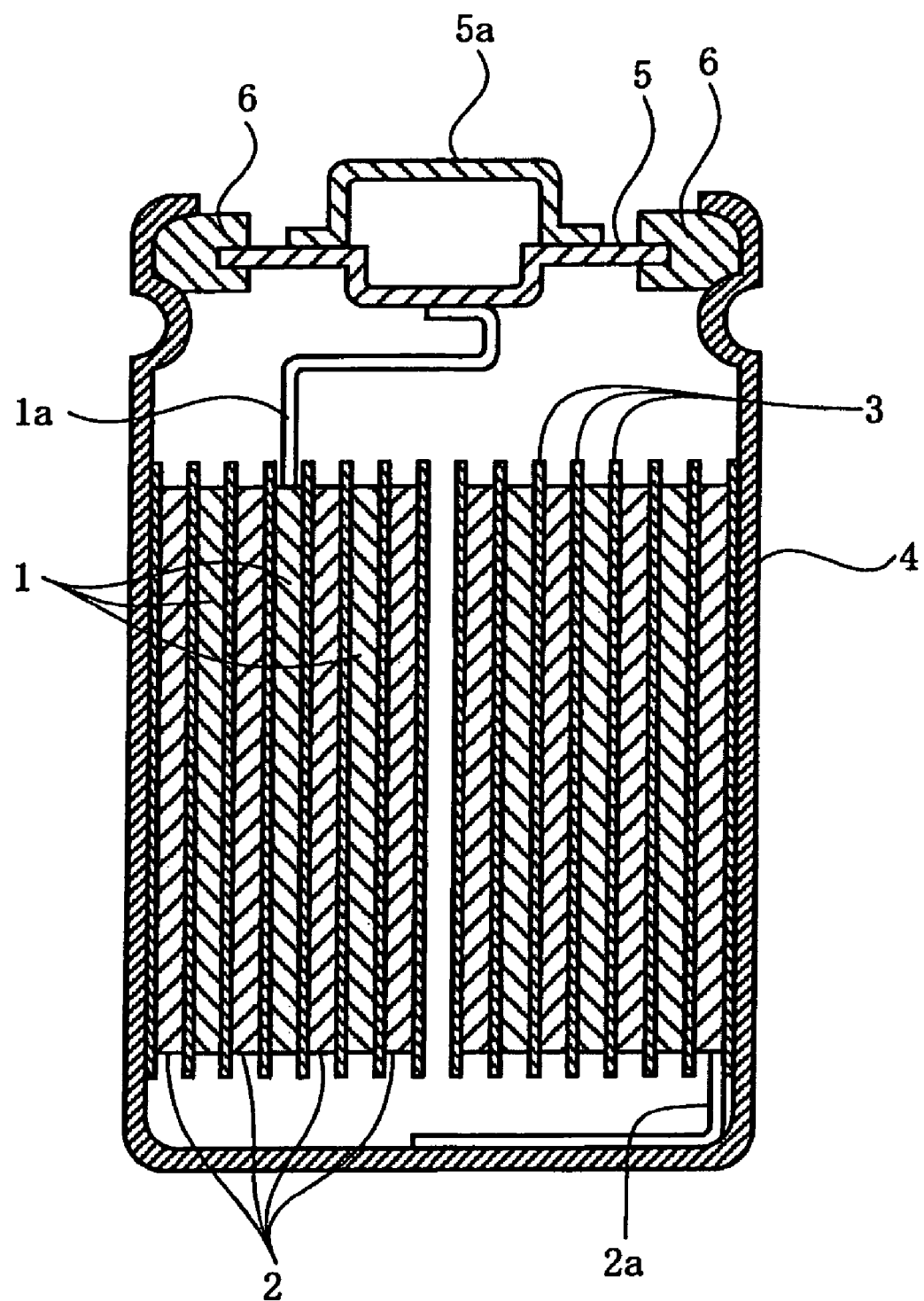

200~# NON-AQUEOUS ELECTROLYTE SECONDARY BATTERY INCLUDING AN ELECTROLYTE CONTAINING A FLUORINATED CYCLIC CARBONATE AND CARBOXYLIC ESTER AS A SOLVENT AND A NITRILE COMPOUND AS AN ADDITIVE

BACKGROUND OF THE INVENTION

1. Field of the Invention

The present invention relates to a non-aqueous electrolyte secondary battery comprising a positive electrode, a negative electrode, a separator interposed between the positive electrode and the negative electrode, and a non-aqueous electrolyte solution in which a solute is dissolved in a non-aqueous solvent. More particularly, the invention relates to improvements in the non-aqueous electrolyte solution of the non-aqueous electrolyte secondary battery that employs a negative electrode active material capable of alloying with lithium for the negative electrode to increase the charge-discharge capacity, so that the charge-discharge cycle performance and the storage performance in a charged state can be improved.

2. Description of Related Art

In recent years, non-aqueous electrolyte secondary batteries have been in use as power sources for mobile electronic devices and electric power storage. A non-aqueous electrolyte secondary battery typically uses a non-aqueous electrolyte and performs charge-discharge operations by transferring lithium ions between the positive electrode and the negative electrode.

In this type of non-aqueous electrolyte secondary battery, a graphite material has been widely used as the negative electrode active material in the negative electrode.

In the case of the graphite material, the discharge potential is flat and the insertion and deinsertion of lithium ions take place between the graphite crystal layers during charge and discharge. As a result, the graphite material has advantages in that it can inhibit the formation of dentritic metallic lithium and also it shows a small volumetric change associated with charge and discharge.

Meanwhile, significant size and weight reductions in mobile electronic devices such as mobile telephones, notebook computers, and PDAs have been achieved in recent years. Moreover, power consumption of such devices has been increasing as the number of functions of the devices has increased. As a consequence, demand has been increasing for lighter weight and higher capacity non-aqueous electrolyte secondary batteries used as power sources for such devices.

However, when a graphite material is used for the negative electrode active material, the above-mentioned demand cannot be met sufficiently because the capacity is not quite sufficient in the graphite material.

For this reason, the materials that can form an alloy with lithium, such as Si, Zn, Pb, Sn, Ge, and Al, have been used in recent years as high capacity negative electrode active materials.

These materials that can form an alloy with lithium undergo extensive volumetric changes in association with the intercalation and deintercalation of lithium. This can result in electrolyte dry-out in the electrode assembly containing the positive electrode and the negative electrode with separators interposed therebetween, especially in the case of the electrode assembly in which the positive electrode and the negative electrode are wound together with a separator interposed therebetween, since the non-aqueous electrolyte solution retained therein is forced out because of the volumetric changes during charge and discharge. As a consequence, the internal resistance of the battery increases considerably, deteriorating the battery performance such as the charge-discharge cycle performance.

In recent years, in order to inhibit the negative electrode active material made of a material capable of alloying with lithium from the deterioration due to the expansion resulting from charge and discharge, it has been proposed to use a non-aqueous electrolyte solution containing a non-aqueous solvent comprising a fluorinated carbonic ester, as disclosed in Japanese Published Unexamined Patent Application No. 2006-86058.

However, the use of the non-aqueous solvent comprising a fluorinated carbonic ester for the non-aqueous electrolyte solution as described above has the following problems. The viscosity of the non-aqueous electrolyte solution increases, impairing the distribution of the non-aqueous electrolyte solution within the battery. Consequently, the internal resistance increases, and battery performance such as the charge-discharge cycle performance deteriorates.

Also in recent years, it has been proposed, as disclosed in Japanese Published Unexamined Patent Application No. 2004-319212, to use a non-aqueous solvent containing methyl acetate and another chain carboxylic ester, in order to lower the viscosity of the non-aqueous electrolyte solution.

However, chain carboxylic esters such as methyl acetate generally have low electrochemical stability in comparison with chain carbonates such as dimethyl carbonate. For this reason, for example, when the non-aqueous electrolyte secondary battery is left in a charged state under a high temperature environment, the non-aqueous electrolyte solution decomposes, and the discharge characteristics deteriorate considerably.

BRIEF SUMMARY OF THE INVENTION

It is an object of the present invention to resolve the foregoing and other problems in a non-aqueous electrolyte secondary battery employing a negative electrode active material capable of alloying with lithium for the negative electrode to improve the charge-discharge capacity. Specifically, it is an object of the present invention to improve the non-aqueous electrolyte solution to obtain better charge-discharge cycle performance and also better storage performance in a charged state.

In order to accomplish the foregoing and other objects, the present invention provides a non-aqueous electrolyte secondary battery comprising: a positive electrode; a negative electrode; a separator interposed between the positive electrode and the negative electrode; and a non-aqueous electrolyte solution in which a solute is dissolved in a non-aqueous solvent, wherein: the negative electrode comprises a negative electrode active material capable of alloying with lithium; the non-aqueous solvent of the non-aqueous electrolyte solution comprises one or more fluorinated cyclic carbonates and a carboxylic ester; and the non-aqueous electrolyte solution contains a nitrile compound having a chain saturated hydrocarbon group having two or more carbon atoms.

In the non-aqueous electrolyte secondary battery of the present invention, a negative electrode active material capable of alloying with lithium is used for the negative electrode. At the same time, one or more fluorinated cyclic carbonates and a carboxylic ester are used for the non-aqueous solvent of the non-aqueous electrolyte solution, and moreover, a nitrile compound having a chain saturated hydrocarbon group having two or more carbon atoms is contained in the non-aqueous electrolyte solution. The one or more fluorinated cyclic carbonates serve to inhibit the negative electrode active material from expanding and deteriorating due to charge and discharge. In addition, the carboxylic ester serves to lower the viscosity of the non-aqueous electrolyte solution. Furthermore, the nitrile compound serves to inhibit the carboxylic ester from reacting and to prevent the non-aqueous electrolyte solution from decomposing, when the non-aqueous electrolyte secondary battery is left in a charged state.

Thus, in the non-aqueous electrolyte secondary battery of the present invention, the negative electrode active material is inhibited from expanding and deteriorating during charge and discharge. At the same time, in the case of using an electrode assembly having a positive electrode and a negative electrode with a separator interposed therebetween, especially in the case of using a wound electrode assembly in which the positive electrode and the negative electrode are wound with a separator interposed therebetween, the non-aqueous electrolyte solution can be infiltrated in the electrode assembly quickly even if the non-aqueous electrolyte solution contained therein is forced out. As a result, the charge-discharge cycle performance of the non-aqueous electrolyte secondary battery is prevented from deteriorating.

What is more, the nitrile compound having a chain saturated hydrocarbon group having two or more carbon atoms serves to inhibit the non-aqueous electrolyte solution from decomposing even when the non-aqueous electrolyte secondary battery is set aside in a charged state under a high temperature environment. Thus, the storage performance in a charged state also improves.

In the non-aqueous electrolyte secondary battery of the present invention, zirconium may be added to lithium cobalt oxide when lithium cobalt oxide is used as the positive electrode active material in the positive electrode. This serves to stabilize the crystal structure of the lithium cobalt oxide, improving the charge-discharge cycle performance even further. At the same time, it is possible to inhibit the carboxylic ester used for the non-aqueous electrolyte solution from causing side reactions other than the charge-discharge reactions at the interface between the positive electrode active material and the non-aqueous electrolyte solution. Thus, the storage performance in a charged state improves even further.

BRIEF DESCRIPTION OF THE DRAWING

FIG. 1 is a schematic cross-sectional view illustrating a non-aqueous electrolyte secondary battery, fabricated in Examples and Comparative Examples of the present invention.

DETAILED DESCRIPTION OF THE INVENTION

A non-aqueous electrolyte secondary battery according to the present invention comprises a positive electrode, a negative electrode, a separator interposed between the positive electrode and the negative electrode, and a non-aqueous electrolyte solution in which a solute is dissolved in a non-aqueous solvent. The negative electrode comprises a negative electrode active material capable of alloying with lithium. The non-aqueous solvent of the non-aqueous electrolyte solution comprises one or more fluorinated cyclic carbonates and a carboxylic ester. The non-aqueous electrolyte solution contains a nitrile compound having a chain saturated hydrocarbon group having two or more carbon atoms.

Examples of the fluorinated cyclic carbonate that may be used for the non-aqueous solvent of the non-aqueous electrolyte solution include 4-fluoro-1,3-dioxolane-2-one, 4,5-difluoro-1,3-dioxolane-2-one, 4,4-difluoro-1,3-dioxolan-2-one, and 4-fluoro-5-methyl-1,3-dioxolane-2-one.

In particular, in order to improve the charge-discharge cycle performance of the non-aqueous electrolyte secondary battery by inhibiting the deterioration of the negative electrode active material capable of alloying with lithium resulting from the expansion associated with charge and discharge, it is preferable to use 4-fluoro-1,3-dioxolane-2-one or 4,5-difluoro-1,3-dioxolane-2-one, which are electrochemically stable. In order to improve the charge-discharge cycle performance even further, it is preferable to use both 4-fluoro-1,3-dioxolane-2-one and 4,5-difluoro-1,3-dioxolane-2-one.

It is preferable that the carboxylic ester used for the non-aqueous solvent of the non-aqueous electrolyte solution be a low viscosity solvent. Examples include methyl acetate, methyl formate, ethyl formate, butyl formate, ethyl acetate, propyl acetate, methyl propionate, ethyl propionate, and methyl butyrate.

In the non-aqueous electrolyte secondary battery according to the present invention, the non-aqueous solvent may contain other non-aqueous solvents that are commonly used, in addition to one or more fluorinated cyclic carbonates and a carboxylic ester. However, in order to improve the charge-discharge cycle performance and the storage performance in a charged state of the non-aqueous electrolyte secondary battery even further, it is preferable that the non-aqueous solvent consist of one or more fluorinated cyclic carbonates and a carboxylic ester.

In the non-aqueous electrolyte secondary battery of the present invention, the nitrile compound having a chain saturated hydrocarbon group having two or more carbon atoms, which is contained in the non-aqueous electrolyte solution, may be at least one compound selected from the group consisting of succinonitrile, valeronitrile, glutaronitrile, heptanenitrile, adiponitrile, pimelonitrile, 1,3,5-pentanetricarbonitrile, suberonitrile, and azelanitrile. In particular, in order to further improve the charge-discharge cycle performance and the storage performance in a charged state of the non-aqueous electrolyte secondary battery, it is preferable that the nitrile compound be a nitrile compound having two or more cyano groups, more preferably a nitrile compound having three or more cyano groups.

In the non-aqueous electrolyte secondary battery according to the present invention, the solute to be dissolved in the non-aqueous solvent may be any solute that is commonly used for non-aqueous electrolyte secondary batteries. Examples include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}C_{10}$, $Li_2B_{12}Cl_{12}$, and mixtures thereof. In addition to these lithium salts, it is preferable that the non-aqueous electrolyte contain a lithium salt having an oxalato complex as anions. An example of the lithium salt having an oxalato complex as anions is lithium bis(oxalato)borate.

In the non-aqueous electrolyte secondary battery of the present invention, the negative electrode active material capable of alloying with lithium, which is used for the negative electrode, may be a material capable of alloying with lithium, such as Si, Zn, Pb, Sn, Ge, and Al, as described above. In particular, it is preferable to use silicon or a silicon alloy, which has high capacity, in order to obtain a high capacity non-aqueous electrolyte secondary battery.

Examples of the silicon alloy include a solid solution of silicon and at least one other element, an intermetallic compound of silicon and at least one other element, and an eutectic alloy of silicon and at least one other element.

Examples of the methods for producing the silicon alloy include arc melting, liquid quenching, mechanical alloying, sputtering, chemical vapor deposition, and baking. Specific examples of the liquid quenching include a single-roller quenching technique, a double-roller quenching technique, and various atomization techniques such as gas atomization, water atomization, and disk atomization.

When preparing a negative electrode using the negative electrode active material as mentioned above, a negative electrode mixture layer containing the negative electrode active material particles and a binder may be applied onto a surface of a negative electrode current collector made of a conductive metal foil, and then the negative electrode mixture may be sintered.

In addition, in the above-described negative electrode, it is preferable that the negative electrode mixture layer adhered to the negative electrode current collector be subjected to a heat treatment at a temperature lower than the glass transition temperature or the melting point of the binder, in order to improve adhesion strength of the negative electrode mixture layer to the negative electrode current collector surface.

Moreover, in the above-described negative electrode, it is preferable that the negative electrode mixture layer adhered to the negative electrode current collector surface be pressure-rolled before the sintering, in order to enhance adhesion between negative electrode active material particles as well as adhesion between the negative electrode current collector and the negative electrode active material particles and at the same time to increase the filling density of the negative electrode active material.

It is preferable that the negative electrode current collector made of a conductive metal foil have a surface roughness Ra of 0.2 μm or greater in the surface on which the negative electrode mixture layer is applied.

The use of such a negative electrode current collector with a large surface roughness Ra provides a large contact area between the negative electrode active material particles and the negative electrode current collector, increasing the adhesion strength between the negative electrode active material particles and the negative electrode current collector significantly. At the same time, the binder can get into the surface irregularity portions in the negative electrode current collector, causing an anchoring effect between the binder and the negative electrode current collector. Thereby, high adhesion strength can be obtained therebetween. As a result, even when the negative electrode active material particles expand and shrink during charge and discharge, the negative electrode mixture layer is inhibited from peeling off from the negative electrode current collector.

It is preferable to use a polyimide, which has high strength, as the binder used for the negative electrode mixture layer to inhibit the negative electrode active material particles from expanding.

In the non-aqueous electrolyte secondary battery according to the present invention, the positive electrode active material in the positive electrode may be any commonly used positive electrode active material that is conventionally known. Usable examples include lithium-containing transition metal oxides including the following; lithium-cobalt composite oxides such as $LiCoO_2$, lithium-nickel composite oxides such as $LiNiO_2$, lithium-manganese composite oxides such as $LiMn_2O_4$ and $LiMnO_2$, lithium-nickel-cobalt composite oxides such as $LiNi_{1-x}Co_xO_2$ ($0<x<1$), lithium-manganese-cobalt composite oxides such as $LiMn_{1-x}Co_xO_2$ ($0<x<1$), lithium-nickel-cobalt-manganese composite oxides, such as $LiNi_xCo_yMn_zO_2$ ($x+y+z=1$), and lithium-nickel-cobalt-aluminum composite oxides such as $LiNi_xCo_yAl_zO_2$ ($x+y+z=1$).

When lithium cobalt oxide $LiCoO_2$ is used for the positive electrode active material, it is desirable to add zirconium thereto, in order to improve the charge-discharge cycle performance by stabilizing the crystal structure and also to inhibit the carboxylic ester used for the non-aqueous electrolyte solution from causing side reactions other than charge-discharge reactions at the interface of the positive electrode active material with the non-aqueous electrolyte solution.

In the case that lithium cobalt oxide $LiCoO_2$ is used for the positive electrode active material, it is preferable that the filling density of the positive electrode be 3.7 g/cm$^3$ or greater, to obtain a high capacity non-aqueous electrolyte secondary battery.

In the non-aqueous electrolyte secondary battery of the present invention, the positive electrode and the negative electrode may be wound with the separator interposed therebetween, and the wound electrode assembly may be enclosed in a battery can. It is preferable that the battery can for enclosing the electrode assembly be a cylindrical battery can, which does not easily deform even when the internal pressure rises due to the gas formation associated with decomposition of the non-aqueous electrolyte solution.

EXAMPLES

Hereinbelow, examples of the non-aqueous electrolyte secondary battery according to the present invention will be described in detail. In addition, it will be demonstrated that the examples of the non-aqueous electrolyte secondary battery according to the invention achieve improved charge-discharge cycle performance and improved storage performance when stored in a charged state, in comparison with comparative examples. It should be construed that the non-aqueous electrolyte secondary battery according to the present invention is not limited to the following examples, but various changes and modifications are possible without departing from the scope of the invention.

Example 1

In Example 1, a non-aqueous electrolyte secondary battery in a cylindrical shape with a diameter of 14 mm and a height of 43 mm, as illustrated in FIG. 1, having a design capacity of 950 mAh was fabricated using a positive electrode, a negative electrode, and a non-aqueous electrolyte solution that were prepared as follows.

Preparation of Positive Electrode

The positive electrode was prepared in the following manner. Lithium cobalt oxide represented as $LiCoO_2$ (average particle size: 13 μm, BET specific surface area: 0.35 m$^2$/g) was used as the positive electrode active material. The positive electrode active material, carbon material powder as a conductive agent, and polyvinylidene fluoride as a binder were mixed at a mass ratio of 95:2.5:2.5, and a N-methyl-2-pyrrolidone solution was added thereto. The mixture was kneaded to prepare a positive electrode mixture slurry.

Next, the resultant positive electrode mixture slurry was applied onto both sides of a positive electrode current collector made of an aluminum foil having a thickness of 15 μm, a length of 480 mm, and a width of 34 mm, in an area 450 mm long and 34 mm wide on each side. This was dried and pressure-rolled. Thereafter, a positive electrode current collector tab made of an aluminum flat plate having a thickness of 70 μm, a length of 35 mm, and a width of 4 mm was attached to a portion of the current collector on which the positive electrode mixture slurry was not applied, by thrust-and-press clamping. Thus, the positive electrode was prepared.

Here, the thickness of the positive electrode was 141 µm, and the filling density of the positive electrode mixture was 3.74 g/cm³.

Preparation of Negative Electrode

The negative electrode was prepared in the following manner. Silicon powder (purity: 99.9%) having an average particle size of 10 µm was used as the negative electrode active material. This negative electrode active material, graphite powder as a conductive agent, and thermoplastic polyimide (glass transition temperature: 190° C., density: 1.1 g/cm³) as a binder were mixed at a mass ratio of 87:3:7.5, and a N-methyl-2-pyrrolidone solution was added thereto. The mixture was kneaded to prepare a negative electrode mixture slurry.

Next, the resultant negative electrode mixture slurry was applied onto both sides of a negative electrode current collector made of a Cu—Ni—Si—Mg alloy foil (Ni: 3 wt %, Si: 0.65 wt %, Mg: 0.15 wt %) having a surface roughness Ra of 0.3 µm and a thickness of 20 µm, and was dried. Then, the resultant material was cut out into a 490 mm×36 mm rectangular shape and pressure-rolled. Subsequently, the pressure-rolled material was sintered at 400° C. for 10 hours in an argon atmosphere. Thereafter, a negative electrode current collector tab made of a nickel flat plate having a thickness of 70 µm, a length of 35 mm, and a width of 4 mm was attached to an end portion thereof by thrust-and-press clamping. Thus, the negative electrode was prepared. The thickness of the negative electrode was 60 µm.

Preparation of Non-Aqueous Electrolyte Solution

The non-aqueous electrolyte solution was prepared in the following manner. A mixed solvent of 4-fluoro-1,3-dioxolane-2-one (FEC) and 4,5-difluoro-1,3-dioxolane-2-one (DFEC), which are fluorinated cyclic carbonates, and methyl propionate (MP), which is a carboxylic ester, at a volume ratio of 15:5:80, respectively, was used as the non-aqueous solvent. $LiPF_6$ as a solute was dissolved into the mixed solvent at a concentration of 1.0 mol/L. To the resultant solution, 0.5 mass % of pimelonitrile was added as the nitrile compound having a chain saturated hydrocarbon group having two or more carbon atoms. Thus, the non-aqueous electrolyte solution was prepared.

Preparation of Battery

A battery was prepared in the following manner. As illustrated in FIG. 1, a separator 3 made of a lithium-ion-permeable, microporous polyethylene film was interposed between the positive electrode 1 and the negative electrode 2, which were prepared in the above-described manner. These were spirally wound together and enclosed into a battery can 4. The positive electrode current collector tab 1a, provided on the positive electrode 1, was connected to a positive electrode cap 5, on which a positive electrode external terminal 5a was provided. The negative electrode current collector tab 2a, provided on the negative electrode 2, was connected to the battery can 4. The battery can 4 was filled with the above-described non-aqueous electrolyte solution and then sealed, and the battery can 4 and the positive electrode cap 5 were electrically isolated by an insulative packing 6.

Example 2

In Example 2, a non-aqueous electrolyte secondary battery of Example 2 was fabricated in the same manner as described in Example 1, except that the amount of the nitrile compound, pimelonitrile, added to the non-aqueous electrolyte solution was set at 1.0 mass % in preparing the non-aqueous electrolyte solution.

Comparative Example 1

In Comparative Example 1, a non-aqueous electrolyte secondary battery of Comparative Example 1 was fabricated in the same manner as described in Example 1 except for the following modifications. In preparing the non-aqueous electrolyte solution, a mixed solvent of 30:70 volume ratio of ethylene carbonate (EC) and dimethyl carbonate (DMC) was used as the non-aqueous solvent, and the nitrile compound, pimelonitrile, was not added to the non-aqueous electrolyte solution.

Comparative Example 2

In Comparative Example 2, a non-aqueous electrolyte secondary battery of Comparative Example 2 was fabricated in the same manner as described in Example 1, except that the nitrile compound, pimelonitrile, was not added to the non-aqueous electrolyte solution in preparing the non-aqueous electrolyte solution.

Non-aqueous electrolyte secondary batteries of Examples 1 and 2 as well as Comparative Examples 1 and 2, fabricated in the above-described manners, were subjected to an initial charge-discharge process at 25° C. as follows. Each of the batteries was charged at a constant current of 190 mA to 4.2 V and thereafter further charged at a constant voltage of 4.2 V until the current value reached 48 mA, and then, each of the batteries was discharged at a constant current of 190 mA to 2.75 V.

Next, each of the non-aqueous electrolyte secondary batteries of Examples 1 and 2 as well as Comparative Examples 1 and 2, which had been subjected to the above-described initial charge and discharge process, was repeatedly charged and discharged as follows. Each of the batteries was charged at a constant current of 950 mA to 4.2 V and further charged at a constant voltage of 4.2 V until the current value reached 48 mA, and thereafter, each of the batteries was discharged at a constant current of 950 mA to 2.75 V. This charge-discharge cycle was repeated 300 times at room temperature.

Then, the discharge capacity Q1 at the first cycle and the discharge capacity Q300 at the 300th cycle were obtained for each of the non-aqueous electrolyte secondary batteries of Examples 1 and 2 as well as Comparative Examples 1 and 2. Then, the capacity retention ratio at the 300th cycle was calculated for each battery using the following equation.

$$\text{Capacity retention ratio } (\%) = (Q300/Q1) \times 100$$

The cycle performance of each of the non-aqueous electrolyte secondary batteries of Examples 1 and 2 and Comparative Example 1 was determined as an index number with respect to the capacity retention ratio of the non-aqueous electrolyte secondary battery of Comparative Example 2, which was taken as 100. The results are shown in Table 1 below.

In addition, each of the non-aqueous electrolyte secondary batteries of Examples 1 and 2 as well as Comparative Examples 1 and 2 that had been subjected to the above-described initial charge-discharge process was charged at a constant current of 950 mA to 4.2 V and further charged at a constant voltage of 4.2 V until the current value reached 48 mA. Then, each of the batteries was discharged at a constant current of 950 mA to 2.75 V, and the discharge capacity Qo before storage was determined for each of the batteries.

Next, under a room temperature condition, each of the non-aqueous electrolyte secondary batteries was charged at a constant current of 950 mA to 4.2 V and further charged at a constant voltage of 4.2 V until the current value reached 48 mA. Then, each of the batteries was set aside for 20 days in a thermostatic chamber at 60° C. Thereafter, each of the non-aqueous electrolyte secondary batteries was discharged at room temperature at a constant current of 950 mA to 2.75 V, and the discharge capacity Qa after storage was determined for each of the non-aqueous electrolyte secondary batteries. Then, the capacity remaining ratio (%) after storage was determined for each of the non-aqueous electrolyte secondary batteries using the following equation. The results are also shown in Table 1 below.

Capacity remaining ratio (%)=$(Qa/Qo) \times 100$

TABLE 1

|  | Positive electrode active material | Non-aqueous electrolyte | | | | | | | |
|---|---|---|---|---|---|---|---|---|---|
|  |  | Non-aqueous solvent and volume ratio | | | | | Amount of pimelonitrile added | Cycle performance | Capacity remaining ratio |
|  |  | FEC | DFEC | MP | EC | DMC | (mass %) |  | (%) |
| Ex. 1 | LiCoO$_2$ | 15 | 5 | 80 | — | — | 0.5 | 102 | 60 |
| Ex. 2 | LiCoO$_2$ | 15 | 5 | 80 | — | — | 1.0 | 101 | 76 |
| Comp. Ex. 1 | LiCoO$_2$ | — | — | — | 30 | 70 | — | 17 | 76 |
| Comp. Ex. 2 | LiCoO$_2$ | 15 | 5 | 80 | — | — | — | 100 | 37 |

The results demonstrate the following. Each of the non-aqueous electrolyte secondary batteries of Examples 1 and 2 and Comparative Example 2, in which the non-aqueous solvent of the non-aqueous electrolyte solution was a mixed solvent of fluorinated cyclic carbonates and a carboxylic ester, exhibited significantly improved cycle performance over the non-aqueous electrolyte secondary battery of Comparative Example 1, in which the non-aqueous solvent of the non-aqueous electrolyte solution was not the mixed solvent of fluorinated cyclic carbonates and a carboxylic ester.

In addition, a comparison was made between the non-aqueous electrolyte secondary batteries of Examples 1, 2 and Comparative Example 2, each of which employed a mixed solvent of fluorinated cyclic carbonates and a carboxylic ester as the non-aqueous solvent of the non-aqueous electrolyte solution. Each of the non-aqueous electrolyte secondary batteries of Examples 1 and 2, in which the non-aqueous electrolyte solution contained a nitrile compound having a chain saturated hydrocarbon group having two or more carbon atoms, exhibited a much higher capacity remaining ratio after storage than the non-aqueous electrolyte secondary battery of Comparative Example 2, in which no nitrile compound was added to the non-aqueous electrolyte solution. Thus, the batteries of Examples 1 and 2 exhibited significantly higher storage performance in a charged state.

Example 3

In Example 3, a non-aqueous electrolyte secondary battery of Example 3 was fabricated in the same manner as described in Example 1, except for the following modifications. In preparing the non-aqueous electrolyte solution, succinonitrile was used as the nitrile compound having a chain saturated hydrocarbon group having two or more carbon atoms, which was added to the non-aqueous electrolyte solution, and the amount of the succinonitrile added was set at 1.0 mass %.

Example 4

In Example 4, a non-aqueous electrolyte secondary battery of Example 4 was fabricated in the same manner as described in Example 1, except for the following modifications. In preparing the non-aqueous electrolyte solution, glutaronitrile was used as the nitrile compound having a chain saturated hydrocarbon group having two or more carbon atoms, which was added to the non-aqueous electrolyte solution, and the amount of the glutaronitrile added was set at 1.0 mass %.

Example 5

In Example 5, a non-aqueous electrolyte secondary battery of Example 5 was fabricated in the same manner as described in Example 1, except for the following modifications. In preparing the non-aqueous electrolyte solution, valeronitrile was used as the nitrile compound having a chain saturated hydrocarbon group having two or more carbon atoms, which was added to the non-aqueous electrolyte solution, and the amount of the valeronitrile added was set at 1.0 mass %.

Example 6

In Example 6, a non-aqueous electrolyte secondary battery of Example 6 was fabricated in the same manner as described in Example 1, except for the following modifications. In preparing the non-aqueous electrolyte solution, heptanenitrile was used as the nitrile compound having a chain saturated hydrocarbon group having two or more carbon atoms, which was added to the non-aqueous electrolyte solution, and the amount of the heptanenitrile added was set at 1.0 mass %.

Example 7

In Example 7, a non-aqueous electrolyte secondary battery of Example 7 was fabricated in the same manner as described in Example 1, except for the following modifications. In preparing the non-aqueous electrolyte solution, 1,3,5-pentanetricarbonitrile was used as the nitrile compound having a chain saturated hydrocarbon group having two or more carbon atoms, which was added to the non-aqueous electrolyte solution, and the amount of the 1,3,5-pentanetricarbonitrile added was set at 1.0 mass %.

Example 8

In Example 8, a non-aqueous electrolyte secondary battery of Example 8 was fabricated in the same manner as described in Example 1, except for the following modifications. In preparing the non-aqueous electrolyte solution, azelanitrile was used as the nitrile compound having a chain saturated hydrocarbon group having two or more carbon atoms, which was added to the non-aqueous electrolyte solution, and the amount of the azelanitrile added was set at 1.0 mass %.

Comparative Example 3

In Comparative Example 3, a non-aqueous electrolyte secondary battery of Comparative Example 3 was fabricated in the same manner as described in Example 1, except for the following modifications. In preparing the non-aqueous electrolyte solution, malononitrile was used as the nitrile compound that was added to the non-aqueous electrolyte solution, and the amount of the malononitrile added was set at 1.0 mass %. Note that the malononitrile has a chain saturated hydrocarbon group having one carbon atom.

Then, the capacity retention ratio at the 300th cycle was determined in the same manner as described above for each of the non-aqueous electrolyte secondary batteries of Examples 3 to 8 and Comparative Example 3 thus prepared, and the cycle performance of each of the non-aqueous electrolyte secondary batteries was determined as an index number with respect to the capacity retention ratio of the non-aqueous electrolyte secondary battery of Comparative Example 2, which was taken as 100. In addition, each of the non-aqueous electrolyte secondary batteries was charged to 4.2 V and set aside in a thermostatic chamber at 60° C. for 20 days, to determine the capacity remaining ratio (%) after storage, in the same manner as described above. The results are shown in Table 2 below, along with the results for the non-aqueous electrolyte secondary batteries of Example 2 and Comparative Example 2.

Also, like the non-aqueous electrolyte secondary batteries of Examples 2 to 8, the non-aqueous electrolyte secondary battery of Comparative Example 3, in which malononitrile, a nitrile compound having a chain saturated hydrocarbon group having one carbon atom, was added to the non-aqueous electrolyte solution, exhibited a much higher capacity remaining ratio than the non-aqueous electrolyte secondary battery of Comparative Example 2, in which no nitrile compound was added, and thus, the battery of Comparative Example 3 achieved improved storage performance in a charged state. Nevertheless, the battery of Comparative Example 3 showed significantly lower cycle performance.

In addition, a comparison was made between the non-aqueous electrolyte secondary battery of Example 6, in which heptanenitrile, having one cyano group, was added to the non-aqueous electrolyte solution as the nitrile compound having a chain saturated hydrocarbon group having two or more carbon atoms, and the non-aqueous electrolyte secondary battery of Example 2, in which pimelonitrile, having two cyano groups, was added to the non-aqueous electrolyte solution, and the non-aqueous electrolyte secondary battery of Example 7, in which 1,3,5-pentanetricarbonitrile, having three cyano groups was added to the non-aqueous electrolyte solution. As the number of cyano groups increased, the capacity remaining ratio after storage accordingly increased, and the storage performance in a charged state also improved in sequence.

Example 9

In Example 9, a non-aqueous electrolyte secondary battery of Example 9 was fabricated in the same manner as described

TABLE 2

| | Positive electrode active material | Non-aqueous solvent and volume ratio | | | Nitrile compound | | Cycle performance | Capacity remaining ratio (%) |
|---|---|---|---|---|---|---|---|---|
| | | FEC | DFEC | MP | Type | Amount added (mass %) | | |
| Ex. 2 | LiCoO$_2$ | 15 | 5 | 80 | pimelonitrile | 1.0 | 101 | 76 |
| Ex. 3 | LiCoO$_2$ | 15 | 5 | 80 | succinonitrile | 1.0 | 101 | 68 |
| Ex. 4 | LiCoO$_2$ | 15 | 5 | 80 | glutaronitrile | 1.0 | 100 | 61 |
| Ex. 5 | LiCoO$_2$ | 15 | 5 | 80 | valeronitrile | 1.0 | 100 | 66 |
| Ex. 6 | LiCoO$_2$ | 15 | 5 | 80 | heptanenitrile | 1.0 | 101 | 68 |
| Ex. 7 | LiCoO$_2$ | 15 | 5 | 80 | 1,3,5-pentanetricarbonitrile | 1.0 | 103 | 79 |
| Ex. 8 | LiCoO$_2$ | 15 | 5 | 80 | azelanitrile | 1.0 | 103 | 79 |
| Comp. Ex. 2 | LiCoO$_2$ | 15 | 5 | 80 | — | — | 100 | 37 |
| Comp. Ex. 3 | LiCoO$_2$ | 15 | 5 | 80 | malononitrile | 1.0 | 88 | 69 |

The results demonstrate the following. Like the non-aqueous electrolyte secondary battery of Example 2, each of the non-aqueous electrolyte secondary batteries of Examples 3 to 8, in which the non-aqueous solvent of the non-aqueous electrolyte solution was a mixed solvent of fluorinated cyclic carbonates and a carboxylic ester and the non-aqueous electrolyte solution contained a nitrile compound having a chain saturated hydrocarbon group having two or more carbon atoms, exhibited a much higher capacity remaining ratio after storage than the non-aqueous electrolyte secondary of Comparative Example 2, in which the non-aqueous electrolyte solution did not contain the nitrile compound. Thus, the batteries of Examples 3 to 8 exhibited significantly improved storage performance in a charged state.

in Example 1, except for the following modifications. In preparing the positive electrode, the positive electrode active material used was the one in which zirconium (Zr) was adhered to the surface of lithium cobalt oxide represented as LiCoO$_2$ (average particle size: 13 μm, BET specific surface area: 0.35 m$^2$/g). Moreover, the amount of pimelonitrile, the nitrile compound added to the non-aqueous electrolyte solution, was set at 1.0 mass %, as in Example 2 above, in preparing the non-aqueous electrolyte solution.

Comparative Example 4

In Comparative Example 4, a non-aqueous electrolyte secondary battery of Comparative Example 4 was fabricated in the same manner as described in Example 1, except for the following modifications. As in Example 9 above, the positive electrode active material used was the one in which zirconium Zr was adhered to the surface of lithium cobalt oxide represented as $LiCoO_2$ (average particle size: 13 μm, BET specific surface area: 0.35 m²/g). Moreover, as in the case of Comparative Example 2 above, the nitrile compound, pimelonitrile, was not added to the non-aqueous electrolyte solution in preparing the non-aqueous electrolyte solution.

Then, for each of the non-aqueous electrolyte secondary batteries of Example 9 and Comparative Example 4 thus prepared, the capacity retention ratio at the 300th cycle was determined in the same manner as described above, and the cycle performance of each of the batteries was determined as an index number with respect to the capacity retention ratio of the non-aqueous electrolyte secondary battery of Comparative Example 2, which was taken as 100. In addition, each of the non-aqueous electrolyte secondary batteries was charged to 4.2 V and set aside in a thermostatic chamber at 60° C. for 20 days, to determine the capacity remaining ratio (%) after storage, in the same manner as described above. The results are shown in Table 3 below, along with the results for the non-aqueous electrolyte secondary batteries of Example 2 and Comparative Example 2.

exhibited further improved cycle performance and also a higher capacity remaining ratio after storage, and thus, the battery of Example 9 exhibited further improved storage performance in a charged state.

Comparative Example 5

In Comparative Example 5, a non-aqueous electrolyte secondary battery of Comparative Example 5 was fabricated in the same manner as described in Example 1 except for the following modifications. In preparing the non-aqueous electrolyte solution, a mixed solvent of 15:5:80 volume ratio of 4-fluoro-1,3-dioxolane-2-one (FEC) and 4,5-difluoro-1,3-dioxolane-2-one (DFEC), which are fluorinated cyclic carbonates, and ethyl methyl carbonate (EMC), which is not a carboxylic ester, was used as the non-aqueous solvent. In addition, the nitrile compound, pimelonitrile, was not added to the non-aqueous electrolyte solution.

Comparative Example 6

In Comparative Example 6, a non-aqueous electrolyte secondary battery of Comparative Example 6 was fabricated in the same manner as described in Example 1 except for the

TABLE 3

| | Positive electrode active material | Non-aqueous electrolyte | | | Amount of pimelonitrile added (mass %) | Cycle performance | Capacity remaining ratio (%) |
| | | Non-aqueous solvent and volume ratio | | | | | |
| | | FEC | DFEC | MP | | | |
|---|---|---|---|---|---|---|---|
| Ex. 9 | $LiCoO_2$ + Zr | 15 | 5 | 80 | 1.0 | 103 | 87 |
| Comp. Ex. 4 | $LiCoO_2$ + Zr | 15 | 5 | 80 | — | 101 | 42 |
| Ex. 2 | $LiCoO_2$ | 15 | 5 | 80 | 1.0 | 101 | 76 |
| Comp. Ex. 2 | $LiCoO_2$ | 15 | 5 | 80 | — | 100 | 37 |

For the non-aqueous electrolyte secondary batteries of Example 9 and Comparative Example 4, in which the positive electrode active material was a lithium cobalt oxide on the surface of which zirconium was adhered, the results were similar to the case of the non-aqueous electrolyte secondary batteries of Example 2 and Comparative Example 2. The non-aqueous electrolyte secondary battery of Example 9, in which the non-aqueous electrolyte solution contained a nitrile compound, exhibited a much higher capacity remaining ratio after storage than the non-aqueous electrolyte secondary battery of Comparative Example 4, in which the non-aqueous electrolyte solution did not contain a nitrile compound. Thus, the battery of Example 9 showed a significantly improved storage performance in a charged state.

In addition, the non-aqueous electrolyte secondary battery of Example 9, in which the positive electrode active material was the lithium cobalt oxide on the surface of which zirconium was adhered, was compared with the non-aqueous electrolyte secondary battery of Example 2, in which the positive electrode active material was the lithium cobalt oxide on the surface of which zirconium was not adhered. It was found that the non-aqueous electrolyte secondary battery of Example 9, in which the positive electrode active material was the lithium cobalt oxide on the surface of which zirconium was adhered, following modifications. In preparing the non-aqueous electrolyte solution, a mixed solvent of 15:5:80 volume ratio of 4-fluoro-1,3-dioxolane-2-one (FEC) and 4,5-difluoro-1,3-dioxolane-2-one (DFEC), which are fluorinated cyclic carbonates, and ethyl methyl carbonate (EMC), which is not a carboxylic ester, was used as the non-aqueous solvent. In addition, the amount of the nitrile compound, pimelonitrile, added to the non-aqueous electrolyte solution, was set at 1.0 mass %.

Then, for each of the non-aqueous electrolyte secondary batteries of Comparative Examples 5 and 6 thus prepared, the capacity retention ratio at the 300th cycle was determined in the same manner as described above. Also, the cycle performance of each of the non-aqueous electrolyte secondary batteries was determined as an index number with respect to the capacity retention ratio of the non-aqueous electrolyte secondary battery of Comparative Example 2, which was taken as 100. In addition, each of the non-aqueous electrolyte secondary batteries was charged to 4.2 V and set aside in a thermostatic chamber at 60° C. for 20 days, to determine the capacity remaining ratio (%) after storage in the same manner as described above. The results are shown in Table 4 below, along with the results for the non-aqueous electrolyte secondary batteries of Example 2 and Comparative Example 2.

TABLE 4

| | Positive electrode active material | Non-aqueous electrolyte | | | | | | |
|---|---|---|---|---|---|---|---|---|
| | | Non-aqueous solvent and volume ratio | | | | Amount of pimelonitrile added | Cycle performance | Capacity remaining ratio |
| | | FEC | DFEC | MP | EMC | (mass %) | | (%) |
| Comp. Ex. 5 | LiCoO$_2$ | 15 | 5 | — | 80 | — | 88 | 70 |
| Comp. Ex. 6 | LiCoO$_2$ | 15 | 5 | — | 80 | 1.0 | 89 | 77 |
| Ex. 2 | LiCoO$_2$ | 15 | 5 | 80 | — | 1.0 | 101 | 76 |
| Comp. Ex. 2 | LiCoO$_2$ | 15 | 5 | 80 | — | — | 100 | 37 |

The results for the non-aqueous electrolyte secondary batteries of Comparative Examples 5 and 6 were compared, in which the non-aqueous solvent of the non-aqueous electrolyte solution was a mixed solvent of 4-fluoro-1,3-dioxolane-2-one (FEC) and 4,5-difluoro-1,3-dioxolane-2-one (DFEC), which are fluorinated cyclic carbonates, and ethyl methyl carbonate (EMC), which is not a carboxylic ester. It was found that the non-aqueous electrolyte secondary battery of Comparative Example 6, which contained pimelonitrile as the nitrile compound, showed a higher capacity remaining ratio after storage, and thus, the battery of Comparative Example 6 showed improved storage performance in a charged state.

Nevertheless, the non-aqueous electrolyte secondary batteries of Comparative Examples 5 and 6, in which the non-aqueous solvent of the non-aqueous electrolyte solution was a mixed solvent containing ethyl methyl carbonate (EMC), which is not a carboxylic ester, showed considerably lower cycle performance than the non-aqueous electrolyte secondary batteries of Example 2 and Comparative Example 2, which used a mixed solvent containing methyl propionate (MP), which is a carboxylic ester.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and is not intended to limit the invention as defined by the appended claims and their equivalents.

What is claimed is:

1. A non-aqueous electrolyte secondary battery comprising: a positive electrode; a negative electrode; a separator interposed between the positive electrode and the negative electrode; and a non-aqueous electrolyte solution in which a solute is dissolved in a non-aqueous solvent, wherein: the positive electrode comprises a positive electrode active material which is a lithium cobalt oxide to which zirconium is added; the negative electrode comprises a negative electrode active material capable of alloying with lithium; the non-aqueous solvent of the non-aqueous electrolyte solution consists of (a) one or more fluorinated cyclic carbonates selected from the group consisting of 4-fluoro-1,3-dioxolane-2-one and 4,5-difluoro-1,3-dioxolane-2-one and (b) a carboxylic ester; the non-aqueous electrolyte solution contains a nitrile compound having a chain saturated hydrocarbon group having two or more carbon atoms; and wherein the negative electrode active material capable of alloying with lithium is a material containing silicon.

2. The non-aqueous electrolyte secondary battery according to claim 1, wherein the nitrile compound is at least one compound selected from the group consisting of succinonitrile, valeronitrile, glutaronitrile, heptanenitrile, adiponitrile, pimelonitrile, 1,3,5-pentanetricarbonitrile, suberonitrile, and azelanitrile.

3. The non-aqueous electrolyte secondary battery according to claim 1, wherein the nitrile compound has two or more cyano groups.

4. The non-aqueous electrolyte secondary battery according to claim 1, wherein the nitrile compound has three or more cyano groups.

5. The non-aqueous electrolyte secondary battery according to claim 1, further comprising a wound electrode assembly comprising the positive electrode, the negative electrode, and the separator interposed between the positive and negative electrodes, the wound electrode assembly being enclosed in a cylindrical battery can.

* * * * *